Patented Nov. 4, 1941

2,261,923

UNITED STATES PATENT OFFICE 2,261,923

TREATMENT OF DISTILLERY SLOP

Ernest E. Pittman and Robert Roger Bottoms, Louisville, Ky., assignors to The Girdler Corporation, Louisville, Ky., a corporation of Delaware No Drawing. Application May 26, 1938, Serial No. 210,163

4 Claims. (Cl. 99—5)

This invention relates to the treatment of waste material such as distillery slop wherein the recovery of useful by-products having a nitrogenous content is desired. These by-products are customarily used for and are intended herein to include cattle feed, fertilizer material, ingredients of a feed, fertilizer, or other materials. By the terms "distillery slop" and "by-products" as used herein is meant such wastes and protein containing recovered residues as may be found in various analogous industries wherein the invention obviously could be employed under conditions similar to those disclosed with respect to distillery operations.

As one illustration of the invention, the treatment of distillery slop is taken as an example, although in its broader aspect, the invention may be practiced in connection with the recovery of many diverse materials in which the problem of separating and recovering dissolved and finely suspended protein ingredients from a liquid waste is involved, as for example, the treatment of soya waste liquids and the like.

Among the several protein ingredients of the usual distillery slop using grain for the manufacture of alcoholic beverages, industrial alcohols, and the like, may be found zein, which is derived from the corn used in the mash; hordein which is derived from the rye or barley; the enzyme diastase derived from the malt; zymase which is used on convert the sugar to alcohol; various proteins derived from the yeast cells, and other protein ingredients in varying amounts.

The heavy shells and husks of the grain are in mechanical suspension in the slop liquid, and are of low protein content. Therefore they will precipitate easily and are unusually recovered in the conventional filters or other separating apparatus. On the other hand, certain of the finely divided protein materials of high protein content, particularly the yeast cells which have about 50% protein in their structure, appear to remain in a finely divided colloidal suspension in the slop liquid and cannot be separated therefrom in a satisfactory commercial manner. In slops derived from molasses fermentation as in the production of industrial alcohol, the removal of such yeast has been most difficult, and this invention teaches a method whereby the yeast particles in suspension and/or in solution may readily be removed from the slop. Many of the other protein ingredients above noted appear to be in true solution in the slop liquid, and heretofore could not be recovered satisfactorily, except by chemical action or by evaporation processes.

The partial recovery of grain values remaining in distillery slop following the distillation process has long been practiced, and many processes have been proposed looking toward an increased recovery of grain values from such slop. However, so far as is known, none of these proposals has successfully been employed in recovering substantially all of the protein material which appears to be held in the waste liquid both in the form of a colloidal suspension and in a true solution with the liquid of the waste. In general, most of the known processes depend upon the addition of auxiliary chemical agents having as an object the recovery of the soluble protein, directly or indirectly, as a result of a chemical reaction of those agents with the ingredients found in the complex structure of the distillery slop.

However, since the recovered grain residues are customarily used in stock feeds wherein the purity of the feed must be such as to avoid any gastronomic disturbance when eaten, and in which the protein content of the feed should be as high as possible, it has been found that many of the previously proposed processes have serious disadvantages. As is obvious, an increase of only a small percentage in protein content or in the volume of grain residues recovered, results in material monetary advantage to the industry in which some units have capacities ranging as high as 20,000 bushels of grain per day supplied to the mash tubs.

It is possible by means of evaporation methods to recover all of the grain elements from the slop, but this has not proved to be entirely satisfactory, due to the cost of the special equipment required, and the production of an inferior final product. Such final product contains the gums, resins, unfermentable sugars such as raffinose, and other undesired ingredients which render the product inferior, especially for use as a live stock feed.

One object of the present invention is to recover a substantially greater percentage of grain residues than that secured by a simple filtering process, and which grain residues will have a protein content of over 30% and be devoid of the undesired gum, resin and acid residues found to be present in the expensive evaporation process.

A further object of the invention is to provide a process of recovery of soluble protein matter from waste materials to such a degree as will substantially reduce the subsequent disposal problem of the liquid effluent.

Another object of the invention is to provide a new and improved process of precipitating solid protein material from liquid wastes by means of an inexpensive, efficient precipitation agent having little or no chemical reaction with the protein material.

Another object of the invention is to provide a method of precipitating colloidally suspended finely divided protein material from liquid wastes.

An important feature of the invention is the use of bentonite materials in precipitation processes.

A further object of the invention is to provide a process of preparing and using bentonite slurry in precipitation processes.

Among the other features and advantages of the invention may be noted the rapid and inexpensive treating of waste maerial; the precipitating of finely divided colloidally suspended material and heavy solid material simultaneously in a form suitable for efficient filtration; the precipitating of soluble and colloidally suspended materials simultaneously from liquid wastes and together with or after the previous removal of the coarser solid material; and the use of a new and important group of precipitation agents for the recovery of by-products and the purification of the residues found in waste materials.

In applying the invention to actual use, many different ways of achieving the desired objects may be employed, without departing from the scope of the invention.

As an example of one way by which the invention may be used in connection with the treatment of distillery slop, the following may be taken as an illustrative application:

The thick slop as it leaves the usual still has a temperature of substantially 100° C., and consists of the heavy grain elements held in mechanical suspension and the light grain elements held in colloidal suspension, in addition to the grain elements in solution. Other ingredients will also be found in the hot slop which in general consists of about 5% total solids and 95% water. To this hot slop and prior to any other treatment, such as filtering or settling thereof, it is proposed to add a liquid slurry of bentonite which possesses the properties of jelling in suspension, due to its colloidal structure. Obviously, however, if it is desired to use conventional screens and presses for removing the heavy solids of a thick slop, the slurry may be added to the residual thin slop in order to carry out the objectives of this invention.

As an example of such a material, bentonite is preferred. Preferably this slurry of precipitation agent is mixed in a ratio of about 1 part bentonite to 15 parts water, and will be formed by the gradual admixture of the dry clay to water maintained in a heated condition. Such a slurry consists of a viscous, readily flowable liquid which may be easily agitated upon introduction into the waste material to be treated.

It has been found that the precipitating action of the bentonite is most effective when mixed with slop having a temperature of 70° C. or higher, and therefore the invention is considered to be best adapted for use in conection with the hot slop as it comes from the still.

However, as will be obvious, the exact proportion of clay and water used in the slurry, the temperature of treatment and percentage of slurry to the thick or thin slop under treatment, may vary widely under different conditions, and the invention therefore is not be considered as limited solely to the exact proportions herein referred to.

As one illustrative example, if 100 gallons of thick hot slop coming from the still, and resulting from a bourbon mix of 65% corn and 35% rye is mixed with 12.5 gallons of bentonite slurry having a 1:15 ratio, the effective precipitation can be completed within twenty minutes. Preferably the mixture is slowly agitated and kept at a temperature in excess of 70° C. As the noticeable and characteristic swelling of the bentonite slurry progresses, the coagulation of grain and bentonite particles may be noted resulting in a light colored amorphous precipitate resting above the heavier precipitate of the larger grain residues such as husks and shells. It is thought that the Brownian movement of the colloidal bentonite which can be observed under a microscope has the effect of placing the minute bentonite particles in position to become attached to the minute particles of protein with the result that a loose union of the two types of particles rapidly takes place, resulting in the formation of the coagulum. It is known that the bentonite particles have a negative electrical potential, and that the protein particles have a positive potential, which fact may afford an explanation for this phenomenon. Furth..rmore, it appears that the intimate mixture of the bentonite slurry with the liquid slop results in bringing a certain amount of the soluble protein out of solution from the liquid and into a coagulated state with the colloidal bentonite and colloidal protein.

Upon passing the treated slop including the agglomerated materials through a filtering or other type of separation step, the heavier solids agglomerate and provide a filter aid for the light bentonite-protein agglomerate, and as a result, the liquid filtrate has a much lower protein content than those heretofore found when the slop is subjected only to chemical treatment followed by the same filtration or ~~paration step. Moreover, it is found that the recovered grain by-product contains a protein content of over 30%, which is higher than with any prior processes with which we are familiar.

The presence of the relatively small amount of bentonite material recovered with the grain does not adulterate the by-product to any appreciable extent, and does not render the grain unpalatable or harmful to live stock, when used as a food.

Tests have indicated that the protein content of the liquid effluent may be reduced from about 1.22% occurring in the usual untreated "thin slop," to about 0.15% when the above bentonite treatment is used. This illustrative example represents the difference found to exist in the application of this invention to a representative fresh slop from a Louisville distillery wherein conventional separation of thick and thin slop was used. Obviously, the exact percentages may vary in accordance with the type of slop, the efficiency of thick slop separation, and similar factors.

Furthermore, it will be evident that after treating the distillery slop in accordance with this invention any subsequent chemical or other treatment of the effluent designed to prevent later putrefaction or fermentation of the non-recovered protein and other oxidizable ingredients such as sugars may be carried out in a more efficient manner, due to the reduction of the protein content as a result of the practice of this invention. Consequently, it is thought that this invention has a widespread application, either for the complete or the partial treatment of distillery slop, thus adapting it to use in different installations where the requirements of the health authorities in regard to waste effluents may be lax, reasonable or stringent.

Having thus described our invention, what we claim as new and desire to secure by Letters Patent is:

1. The method of increasing the recovery of useful by-products from distillery slop, including mixing bentonite material with a slop containing heavy grain particles together with protein in solution and in collodial suspension and thereby forming an agglomerate of the soluble and colloidally suspended protein and other suspended solids with the bentonite, and then separating the agglomerate and heavy grain particles from the slop liquid.

2. The method of recovering useful by-products from protein containing waste liquids remaining after the removal of useful volatile constituents during a distillation process, including mixing colloidal bentonite which has the property of jelling in suspension in water with said liquid and thereby forming a coagulum of bentonite and protein, and then separating the agglomerate of said coagulum and other suspended solids from said liquid.

3. The method of recovering useful by-products from protein containing waste liquids containing protein in solution and remaining after removal by distillation of valuable volatile constituents, which includes mixing colloidal bentonite which has the property of jelling in suspension in water with said liquid to thereby separate the soluble protein from solution in the form of a coagulum of bentonite and protein, and then separating said coagulum from said liquid.

4. The method of recovering useful by-products from protein containing waste liquids remaining after the distilling off of valuable volatile constituents and which contains protein in colloidal suspension, including mixing colloidal bentonite which has the property of jelling in suspension in water with said liquid to thereby form a coagulum of bentonite and protein in colloidal suspension, and then separating said coagulum from said liquid.

ERNEST E. PITTMAN.
ROBERT ROGER BOTTOMS.